US012785315B2

(12) United States Patent
Harrison

(10) Patent No.: US 12,785,315 B2
(45) Date of Patent: Nov. 3, 2026

(54) GFCI SOCKET RECEPTACLE COVER

(71) Applicant: Kenneth Harrison, Palm Beach Gardens, FL (US)

(72) Inventor: Kenneth Harrison, Palm Beach Gardens, FL (US)

( * ) Notice: Subject to any disclaimer, the term of this patent is extended or adjusted under 35 U.S.C. 154(b) by 337 days.

(21) Appl. No.: 18/652,403

(22) Filed: May 1, 2024

(65) Prior Publication Data

US 2024/0396250 A1 Nov. 28, 2024

Related U.S. Application Data

(60) Provisional application No. 63/504,613, filed on May 26, 2023.

(51) Int. Cl.
*H01R 13/447* (2006.01)

(52) U.S. Cl.
CPC .................................. *H01R 13/447* (2013.01)

(58) Field of Classification Search
CPC .................................................... H01R 13/447
USPC .......................................................... 439/142
See application file for complete search history.

(56) References Cited

U.S. PATENT DOCUMENTS

| | | | | |
|---|---|---|---|---|
| 6,700,062 | B1 * | 3/2004 | Allen, Jr. | H01R 31/02 174/53 |
| 7,862,350 | B2 * | 1/2011 | Richter | H01R 13/7135 439/107 |
| 8,382,497 | B2 * | 2/2013 | Huang | H01R 13/7135 439/137 |
| 2011/0102953 | A1 * | 5/2011 | Bonilla | H02H 3/338 361/42 |
| 2013/0295788 | A1 * | 11/2013 | Baldwin | H01R 13/453 439/137 |
| 2016/0352092 | A1 * | 12/2016 | Weeks | H02H 3/00 |

* cited by examiner

*Primary Examiner* — Gary F Paumen
(74) *Attorney, Agent, or Firm* — McHale & Slavin, P.A.

(57) ABSTRACT

A GFCI socket receptacle cover having a pair of plunger biasing members that extend from the TEST/RESET buttons on a GFCI socket assembly to the outer surface of the receptacle cover is disclosed. The GFCI socket receptacle cover is comprised of a raised front wall, opposed lateral side walls, and opposed longitudinal side walls, defining a cover interior. Each of the pair of plunger biasing members terminate on one end with a pair of outer surface buttons on the outer surface of the front wall, and on the opposite end within the receptacle cover interior abutting the pair of buttons on the GFCI socket assembly; wherein depression of either outer button simultaneously depresses the corresponding TEST or RESET button on the GFCI socket assembly.

15 Claims, 3 Drawing Sheets

GFCI SOCKET RECEPTACLE COVER

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 63/504,613, entitled "RECEPTACLE COVER WITH PLUNGER BIASING MEMBERS FOR A GFCI SOCKET", filed May 26, 2023. The contents of the above referenced application are incorporated herein by reference in their entirety.

FIELD OF THE INVENTION

The present invention relates to an electrical socket receptacle cover; and more particularly, to a ground fault circuit interrupter "GFCI" electrical receptacle cover having a means for accessing and depressing the TEST and RESET buttons on a GFCI socket assembly through a faceplate.

BACKGROUND OF THE INVENTION

A GFCI outlet is an alternating circuit outlet that protects against electrical shocks in wet areas. A GFCI outlet using a built in sensor monitors electricity between the neutral and ground inlets. If a ground fault as low as 4 milliamps is detected, the senor trips to cut the electrical power to the circuit. Depending on the application and location, GFCI sockets can be mounted either in a horizontal or vertical orientation. Once mounted, the wires are installed and connected to the electrical component therein and the box is closed with a faceplate. The faceplate must be chosen to match the installed electrical component and cover the top opening of the electrical box, thus preventing any damage to the components mounted in the box or accidental contact with live electrical wires.

Due to the varied needs for electrical power and switching, it is sometimes necessary to mount a box in a location where it will be exposed to wet conditions. The GFCI socket circuit used to break power to the device when leakage current to ground is detected is used to protect equipment and to reduce the risk of serious harm from an ongoing electric shock. GFCI protection is required on electrical boxes in wet locations and locations where there exists an easy path for fault current to travel to earth. This includes all boxes intended to service kitchen counter surfaces, crawl spaces at or below grade level, basements, garages and accessory buildings, bathrooms, and laundry areas within six feet of the outside edge of a sink, bathtub or shower stall, as well as outdoors. When used in a location where the electrical box will be exposed to water, it is necessary to provide for a structure to ensure that water does not enter the box and thereby damage the components therein or cause a "short circuit".

An effective way to prevent water from entering an electrical box is to provide an electrical receptacle cover for the faceplate, thus providing a weatherproof seal. The receptacle cover includes an exchangeable hinge, such that the cover can be pivotally opened for gaining easy access to the components that are shielded by the cover and allow for easy exchange between a vertical or horizontal opening. When a ground fault occurs, due to things like damaged wiring, water or an out-of-date tool, the energy being generated to run an electrical device suddenly takes a detour from its intended path and could channel through conductive items it may be in contact with, things like metal utensils, the casing of certain appliances, or water. To prevent injury, or worse, from happening in case of a ground fault, the GFCI sensor should be checked frequently. If something disrupts the current, such as a person, the outlet immediately cuts power to prevent the current from making its way to the person.

GFCI sockets need to be tested for a variety of reasons. Testing ensures that the GFCI device is working as intended. Over time, various factors such as environmental conditions, wear and tear, or electrical surges can affect its performance. Regular testing helps confirm that it will trip and interrupt the circuit when a ground fault occurs. Faulty GFCI devices may not provide adequate protection against electric shocks. Testing helps ensure the safety of individuals using electrical appliances or outlets connected to the GFCI circuit.

Testing GFCI sockets is often required by electrical codes and standards. Regular testing ensures compliance with these regulations, which are put in place to protect people from electrical hazards. Routine testing can help identify any issues with the GFCI device before they escalate into more significant problems. It allows for timely repairs or replacements, minimizing the risk of electrical accidents or damage to equipment.

To test a GFCI socket, a "Test" button on the outlet itself is depressed. This simulates a ground fault and should cause the GFCI to trip, cutting off power to the circuit. After testing, a "Reset" button is depressed to restore power to the outlet. If the GFCI does not trip when tested, or if it fails to reset afterward, it may indicate a problem with the device that requires further inspection or replacement.

What is lacking in the industry is a GFCI socket receptacle cover that allows testing and resetting of the GFCI socket receptacle without opening the receptacle cover.

When a receptacle cover is provided to an electrical box having a GFCI socket assembly, it is difficult to see the TEST and RESET buttons on the GFCI socket assembly and access the TEST and RESET buttons without having to open the receptacle cover. Opening the receptacle cover may break an otherwise sealed box which can cause a ground fault in and of itself.

SUMMARY OF THE INVENTION

A raised receptacle cover having a pair of plunger biasing members that extend from the TEST/RESET buttons on a GFCI socket assembly to the outer surface of the receptacle cover is disclosed. The receptacle cover is comprised of a raised front wall, opposed lateral side walls, and opposed longitudinal side walls defining a cover interior. Each of the pair of plunger biasing members terminate on one end with a pair of outer surface buttons on the outer surface of the front wall, and the opposite end within the receptacle cover interior abutting the pair of buttons on the GFCI socket assembly, wherein depression of either outer button simultaneously depresses the corresponding TEST or RESET button on the GFCI socket assembly.

Accordingly, it is a primary objective of the invention to provide a receptacle cover that allows quick and easy access to the interior without having to open the receptacle cover to push the TEST or RESET button.

It is a further objective of the invention to provide at least one biasing member between the receptacle cover and at least one of the buttons on the GFCI socket assembly.

It is yet another objective of the invention to provide a receptacle cover that is opaque in order to magnify the color of the TEST or RESET button.

It is a still further objective of the invention to provide a receptacle cover that is transparent to allow visual inspection through the receptacle cover.

It is another objective of the invention to provide outer surface buttons on the receptacle cover corresponding to each of the TEST and RESET buttons.

It is yet another further objective of the invention to provide the outer surface buttons that can be color coordinated with its corresponding TEST or RESET button. For example, a red color to correspond to the RESET button and a black color to correspond to the TEST button.

It is yet another objective of the instant invention to provide a receptacle cover that prevents moisture and dust from contacting the electrical device.

Other objective and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
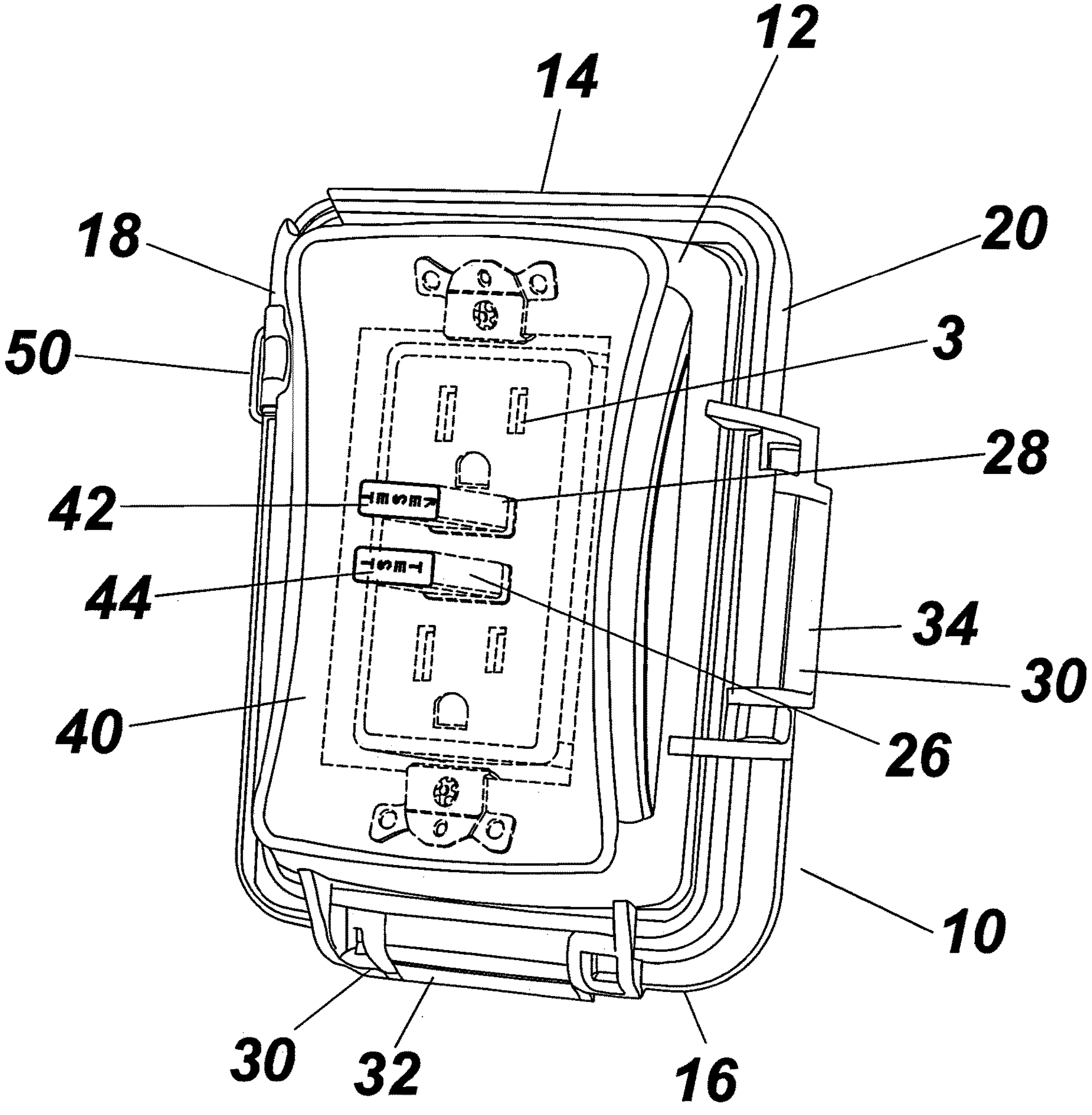
FIG. 1 is a front perspective view of the receptacle cover in a closed position.
Figure 2:
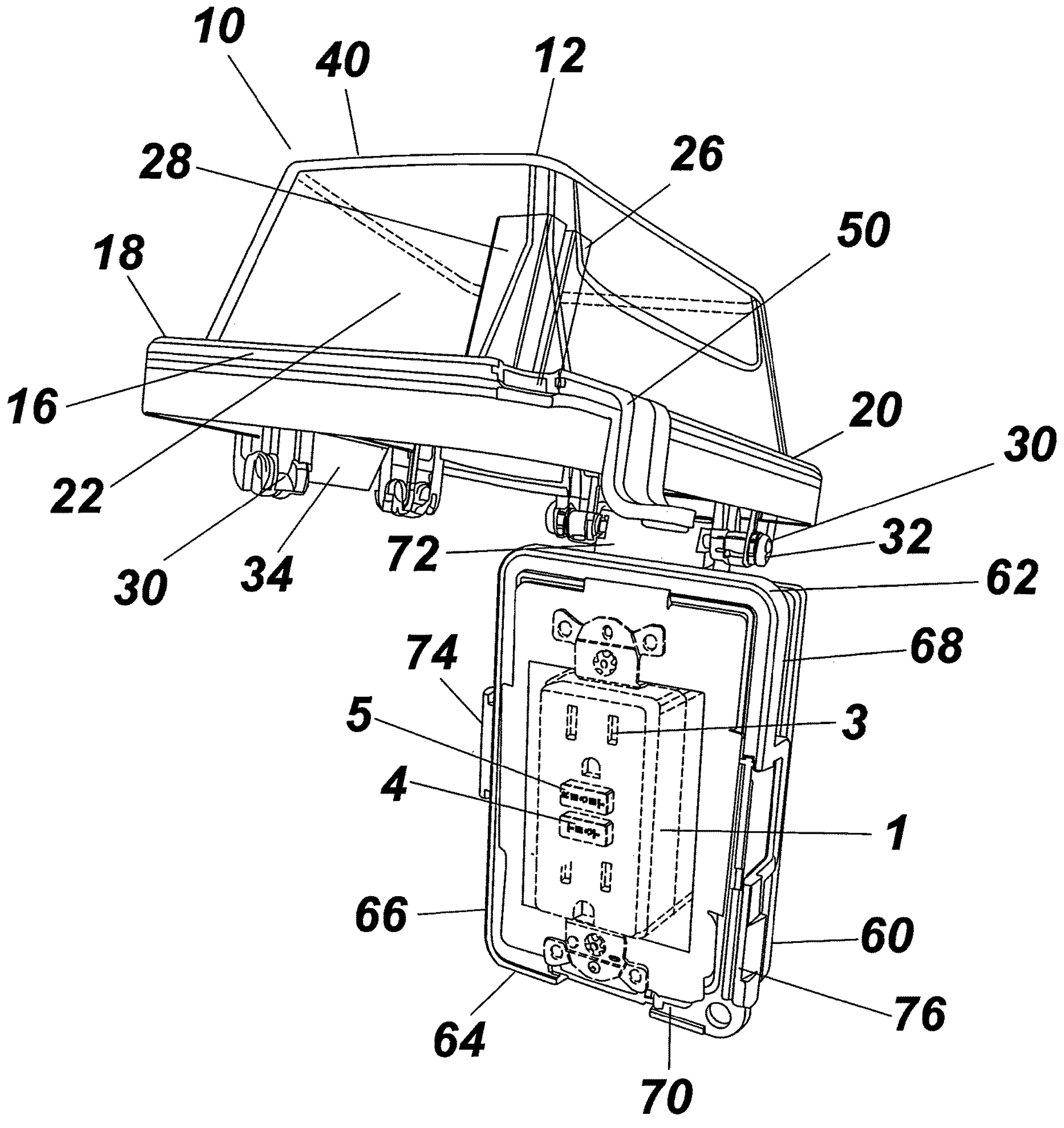
FIG. 2 is a front perspective view of the receptacle cover in an open position.
Figure 3:
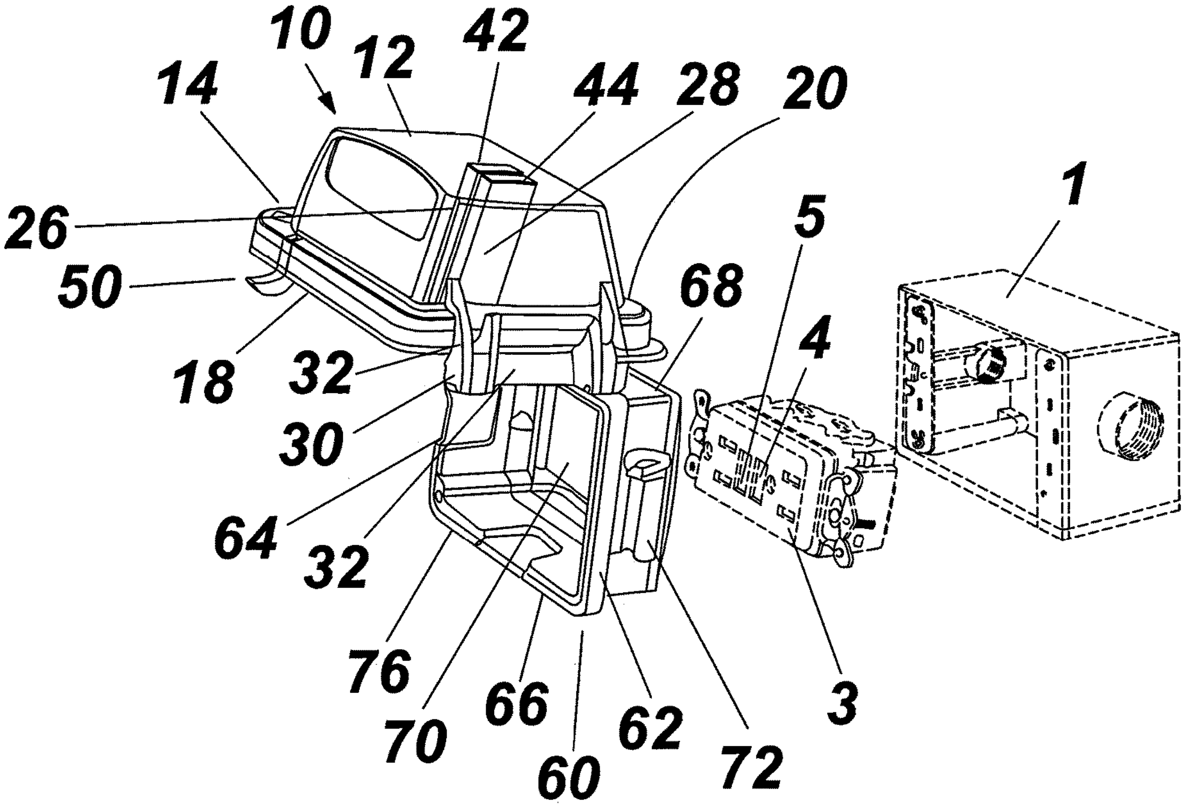
FIG. 3 is an exploded view of the receptacle cover and an electrical device in a disassembled state.

As shown in FIGS. 1-3, an embodiment of a receptacle cover with a plunger biasing member, referred to herein as a raised receptacle cover 10 is illustrated. The raised receptacle cover 10 is attachable to an electrical box 1 and is comprised of a first plunger biasing member 26 and a second plunger biasing member 28, both of which extend to the TEST button 4 and RESET button 5, respectively, on a GFCI socket assembly 3 to the outer surface 40 of the receptacle cover 10. The receptacle cover 10 is designed to provide a user quick and easy access to the GFCI socket assembly 3 without having to open the receptacle cover 10 to push the TEST button 4 or RESET button 5. The first plunger biasing member 26 and the second plunger biasing member 28 each terminate in an end surface outside the receptacle cover's front wall 12, which is defined as a first outer surface button 42 and a second outer surface button 44. The receptacle cover 10 also prevents moisture and dust from contacting the electrical box 1 and socket assembly 3. As shown, the receptacle cover 10 is preferably constructed of a transparent material in order to see the TEST button 4 and RESET button 5 on the GFCI socket assembly 3.

More specifically, the receptacle cover 10 is comprised of a raised front wall 12, opposed lateral side walls, 14 and 16, and opposed longitudinal side walls, 18 and 20, defining a cover interior 22. The front wall 12 has an outer surface 40; extending beyond the front wall outer surface 40 are the pair of outer surface buttons, first outer surface button 42 and second outer surface button 44, each operatively connected to a first plunger biasing member 26 and the second plunger biasing member 28, within the cover interior 22 that abuts the TEST button 4 and RESET button 5 on the GFCI socket assembly 3. In use, depression of either of the first outer surface button 42 or the second outer surface button 44 simultaneously depresses the corresponding TEST button 4 or RESET button 5 on the GFCI socket assembly 3. The first plunger biasing member 26 and second plunger biasing member 28 are integral to the receptacle cover and operatively cooperate with the corresponding TEST button 4 or RESET button 5 on the GFCI socket assembly 3. In one embodiment, the first outer surface button 42 and second outer surface button 44 can be color coordinated with their corresponding TEST button 4 or RESET button 5. For example, a red color can be used to correspond to the RESET button 5 and a black color to correspond to the TEST button 4. In an illustrative embodiment, the color would appear on the sidewall of the button so that when the GFCI socket assembly 3 is "tripped" or "faulted" the corresponding colored button would stand out relative to the receptacle cover 10 and the other button. The receptacle cover 10 further includes a pair of hinge mating assemblies 30. The first hinge mating assembly 32 extending in a first orientation from one of the lateral side walls 14 and the second hinge mating assembly 34 extending in a second orientation from one of the longitudinal side walls 18. It is contemplated that the first outer surface button 42 and the second outer surface button 44 each have an outer plastic covering, not shown, in order to prevent moisture and dust from contacting the electrical box 1 and socket assembly 3. In a preferred embodiment, the second outer surface button 44 will always be in an extending position from the faceplate and black in color, and the first outer surface button 42 will be flush with the faceplate. In one embodiment, the first outer surface button 42 will be of the same color as the faceplate, resulting in it being practically invisible from a near distance. Once the GFCI has been tripped as the result of a fault, the first outer surface button 42 will extend, thereby exposing a red color on the side of the plunger 28 indicating that the power has been disabled. When this device is installed on the exterior of a building, it is often covered in time by landscaping plants, such as bushes and hedges, making it difficult to access. With conventional GFCI cases, an individual would have to reach through the landscaping plants to access the GFCI case and then use their finger to determine if the GFCI has been tripped, and then, with great difficulty, depress the reset button to cause a reset. The instant invention allows the GFCI to be reset without opening the case. Further, the remote operation of the buttons does not interrupt the function of the case seal, providing longevity of the GFCI electrical circuit. In another embodiment, the first outer surface button 42 and second outer surface button 44 may be of different shapes and sizes. For instance, the button 42, 44 may be shaped to receive the end of a broom handle; and in another embodiment, the shape may be shaped to receive small rods, such as the end of a pencil, to cause depression of the buttons 42, 44.

The faceplate 60 attaches to the electrical box 1 and provides pivotable engagement with the raised receptacle cover 10. The faceplate 60 includes a mounting surface comprised of corresponding opposed lateral walls, 62 and 64, corresponding opposed longitudinal walls, 66 and 68, and an opening 70 sized to adapt to the electrical box 1, more specifically, to the GFCI socket assembly 3. The faceplate 60 also includes a pair of corresponding hinge assemblies, 72 and 74, on each of the corresponding lateral and longitudinal walls on the faceplate 60. The hinge assemblies, 32 and 34, on the raised receptacle cover 10 and the corresponding hinge assemblies, 72 and 74, on the faceplate 60 operatively engage for pivotable engagement to allow the receptacle cover 10 to be opened and closed. In the closed position, the locking mechanism 50 on the receptacle cover 10 can engage with a detent 76, which is disposed on the lateral walls, 62 and 64, or longitudinal walls, 66 and 68, on the faceplate 60.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A GFCI socket receptacle cover comprising:

a receptacle faceplate having opposing lateral side walls and spaced apart longitudinal end walls constructed and arranged to be secured to an electrical box housing a GFCI socket;

a receptacle cover having a front wall with opposing lateral end walls and spaced apart longitudinal side walls depending therefrom, said receptacle cover securable to said receptacle faceplate;

a hinge assembly rotatably securing said receptacle cover to said receptacle faceplate;

a hinge mating assembly releasably securing said receptacle cover to said receptacle faceplate, wherein said hinge assembly is constructed and arranged to allow said receptacle cover to be moved from an open position for access to the GFCI socket or to a closed position enclosing said GFCI socket to the electrical box and said hinge mating assembly for securing said receptacle cover in the closed position;

a first plunger biasing member extending through the outer surface of said front wall of said receptacle cover for engaging a TEST button on the GFCI socket when said receptacle is in the closed position;

a second plunger biasing member extending through the outer surface of said front wall of said receptacle cover for engaging a RESET button on the GFCI socket when said receptacle is in the closed position;

wherein said TEST or RESET button on said GFCI can be operated when said receptacle cover is in the closed position.

2. The GFCI socket cover according to claim 1, wherein said receptacle cover is constructed of transparent material wherein the position of the TEST and the RESET button is viewable.

3. The GFCI socket cover according to claim 1, wherein said first outer surface button is colored corresponding to the RESET button and said second outer surface button is colored corresponding to the TEST button.

4. The GFCI socket cover according to claim 1, wherein said first outer surface button and said second outer surface button each have an outer covering to inhibit debris from entering an interior of said receptacle cover.

5. The GFCI socket cover according to claim 1, wherein said first outer surface button and said second outer surface button are different shapes.

6. The GFCI socket cover according to claim 1, wherein said first outer surface button and said second outer surface button are different sizes.

7. The GFCI socket cover according to claim 1, wherein said hinge mating includes a detent to positively secure said receptacle cover in a closed position to said receptacle faceplate.

8. The GFCI socket cover according to claim 1, wherein said receptacle faceplate and said receptacle cover are in a vertical orientation.

9. The GFCI socket cover according to claim 1, wherein said receptacle faceplate and said receptacle cover are in a horizontal orientation.

10. The GFCI socket cover according to claim 1, wherein said hinge assembly and said hinge mating assembly are interchangeable.

11. The GFCI socket cover according to claim 1, wherein said receptacle cover includes an opening to allow passage of electrical cords plugged into the GFCI socket.

12. The GFCI socket cover according to claim 1, wherein said receptacle cover partially overlaps said receptacle faceplate to shield the GFCI socket from debris.

13. The GFCI socket cover according to claim 1, wherein one said plunger extends outward from the front cover and is black in color, and the second plunger is flush with the cover and may be the same color as the receptacle cover.

14. The GFCI socket cover according to claim 1, wherein a portion of said plunger is colored, wherein a tripped GFCI socket is noticeable by the different color extending through the receptacle cover.

15. The GFCI socket cover according to claim 1, wherein said receptacle cover is opaque.

* * * * *